(12) United States Patent
Aiba

(10) Patent No.: US 10,264,210 B2
(45) Date of Patent: Apr. 16, 2019

(54) VIDEO PROCESSING APPARATUS, METHOD, AND SYSTEM

(71) Applicant: Akihito Aiba, Kanagawa (JP)

(72) Inventor: Akihito Aiba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/218,655

(22) Filed: Jul. 25, 2016

(65) Prior Publication Data
US 2017/0041556 A1 Feb. 9, 2017

(30) Foreign Application Priority Data

Aug. 3, 2015 (JP) .................................. 2015-153451
Jun. 3, 2016 (JP) .................................. 2016-111652

(51) Int. Cl.
| | | |
|---|---|---|
| H04N 5/77 | (2006.01) | |
| H04N 7/14 | (2006.01) | |
| H04N 9/802 | (2006.01) | |
| G10L 17/00 | (2013.01) | |

(52) U.S. Cl.
CPC ............... *H04N 5/77* (2013.01); *H04N 7/147* (2013.01); *H04N 9/802* (2013.01); *G10L 17/00* (2013.01)

(58) Field of Classification Search
None
See application file for complete search history.

(56) References Cited

U.S. PATENT DOCUMENTS

| | | | | |
|---|---|---|---|---|
| 2002/0054047 A1* | 5/2002 | Toyama | .................. | G06T 13/40 |
| | | | | 345/629 |
| 2007/0165820 A1* | 7/2007 | Krantz | .................. | H04M 3/569 |
| | | | | 379/202.01 |
| 2013/0083151 A1* | 4/2013 | Kim | .................... | H04L 65/1069 |
| | | | | 348/14.07 |
| 2013/0169742 A1* | 7/2013 | Wu | ........................ | H04N 7/147 |
| | | | | 348/14.08 |
| 2016/0359941 A1* | 12/2016 | Kvaal | .................. | H04L 65/605 |

FOREIGN PATENT DOCUMENTS

| | | |
|---|---|---|
| JP | 1-140884 | 6/1989 |
| JP | 4-309087 | 10/1992 |
| JP | 5-111020 | 4/1993 |

(Continued)

OTHER PUBLICATIONS

U.S. Appl. No. 14/984,728, filed Dec. 30, 2015.

*Primary Examiner* — Maria El-Zoobi
(74) *Attorney, Agent, or Firm* — Oblon, McClelland, Maier & Neustadt, L.L.P.

(57) ABSTRACT

A video processing apparatus includes a camera to continuously capture an image of an object to acquire video data, a memory, and circuitry to identify, from among a plurality of users appearing in the video data, a user who is speaking at a point in time when the video data is acquired as a currently-speaking user, store, in the memory, speech history information that associates, for each point in time when the video data is acquired during at least a predetermined time period, the currently-speaking user with time information indicating the point in time when the video data is acquired, and based on the speech history information, identify a first user currently speaking and a second user who is to be displayed enlarged together with the first user.

8 Claims, 12 Drawing Sheets

(56) References Cited

FOREIGN PATENT DOCUMENTS

| | | |
|---|---|---|
| JP | 11-352987 | 12/1999 |
| JP | 2001-067098 | 3/2001 |
| JP | 2005-274707 | 10/2005 |
| JP | 2007-053513 | 3/2007 |
| JP | 2009-038466 | 2/2009 |
| JP | 2010-192956 | 9/2010 |
| WO | WO2005/114576 | 12/2005 |

* cited by examiner

| TIME | SPEAKER | SPEECH START TIME | SPEECH END TIME | DISPLAY TARGET |
|---|---|---|---|---|
| 0:00:00 | A | 0:00:00 | 0:03:00 | A |
| 0:03:02 | B | 0:03:02 | 0:05:30 | B |
| 0:05:35 | A | 0:05:35 | 0:08:20 | A |
| 0:08:20 | B | 0:08:20 | 0:09:02 | B |
| 0:09:03 | A | 0:09:03 | 0:11:58 | A |
| 0:12:05 | B | 0:12:05 | 0:12:48 | A&B |
| 0:12:55 | A | 0:12:55 | 0:14:30 | A&B |
| 0:14:31 | B | 0:14:31 | 0:14:50 | A&B |
| 0:14:52 | D | 0:14:52 | 0:16:02 | D |
| 0:16:03 | B | 0:16:03 | 0:16:28 | B |
| 0:16:28 | A | 0:16:28 | 0:16:55 | A |
| . | . | . | . | . |
| . | . | . | . | . |
| . | . | . | . | . |

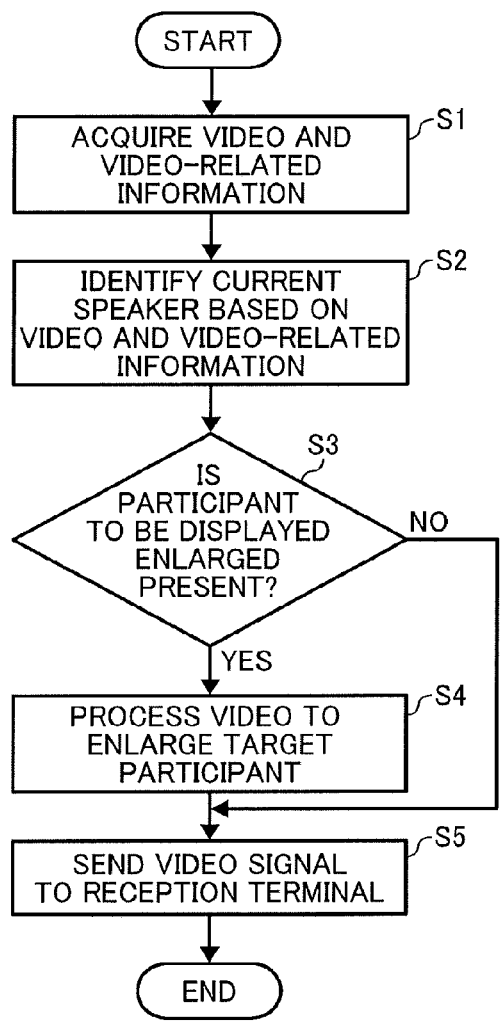
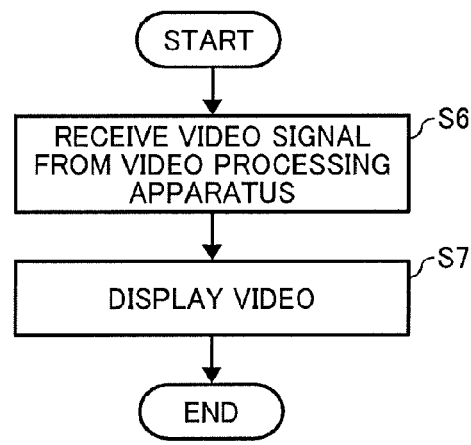
FIG. 5A
FIG. 5B

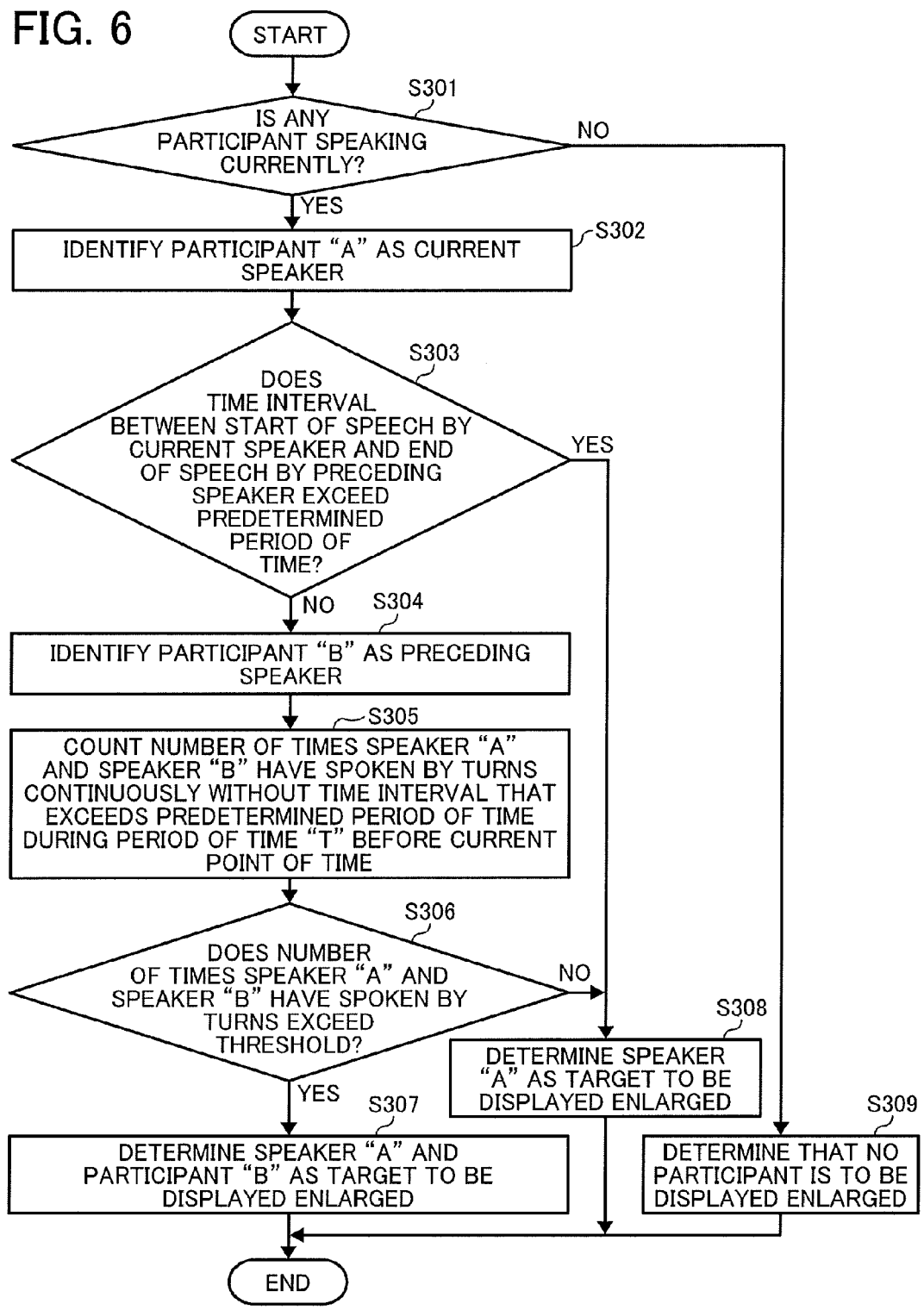

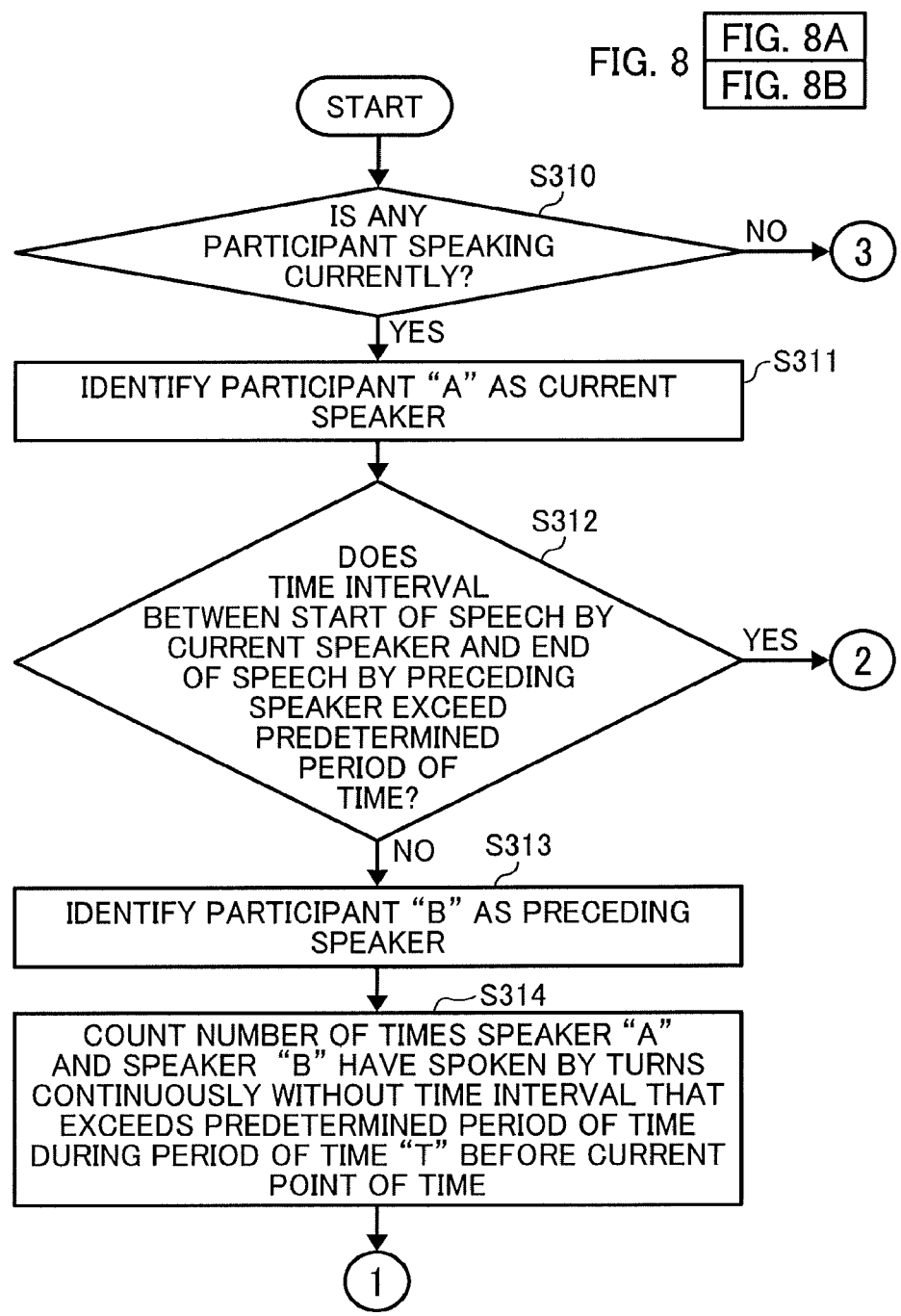

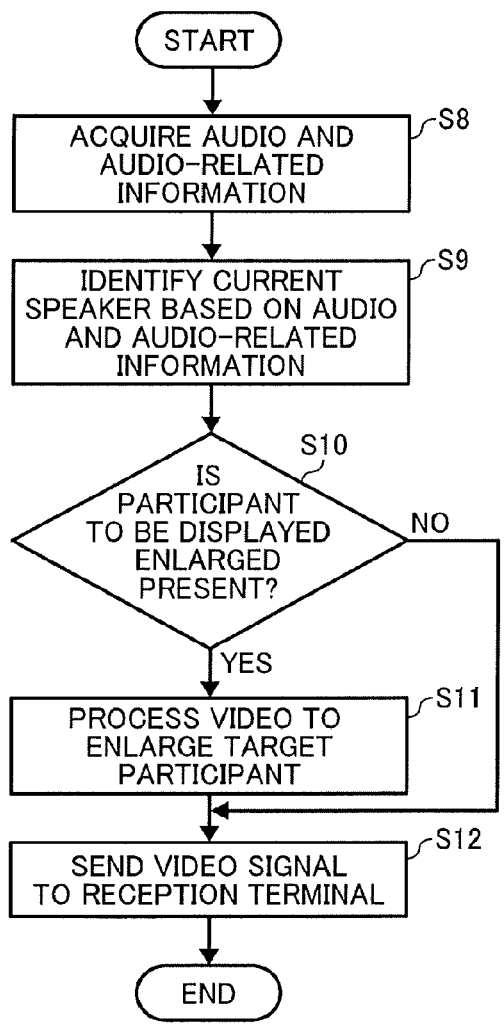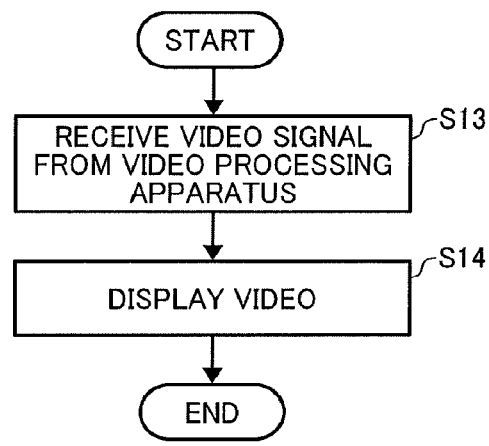
FIG. 11A
FIG. 11B

VIDEO PROCESSING APPARATUS, METHOD, AND SYSTEM

CROSS-REFERENCE TO RELATED APPLICATIONS

This patent application is based on and claims priority pursuant to 35 U.S.C. § 119(a) to Japanese Patent Application Nos. 2015-153451, filed on Aug. 3, 2015, and 2016-111652, filed on Jun. 3, 2016 in the Japan Patent Office, the entire disclosures of which are hereby incorporated by reference herein.

BACKGROUND

Technical Field

The present disclosure relates to a method, apparatus, and system for processing video.

Description of the Related Art

Remote communication systems such as video conference systems are now in widespread use, allowing users of different terminals at different locations to communicate by simultaneous two-way video and audio transmissions. Some video conference systems support an audio source detection application or a facial recognition application for identifying an active speaker who is currently speaking from among a plurality of participants, and displaying enlarged video of the active speaker to attract the other participants' attention.

However, with typical systems for displaying the enlarged video of the active speaker, the video displayed on a screen is sometimes switched too quickly in response to frequent changes in speaker. Such quick change in display is not suitable for viewing. To address this issue, it has been proposed to limit the switching of displaying the enlarged video of the active speaker. However, this leads to delay of display change in response to quick changes in the current speaker.

Further, in addition to typical systems for displaying the enlarged video of the active speaker, systems for determining a main speaker in the conference other than the current active speaker has been wanted. If a target to be displayed enlarged is limited to the current speaker, the video displayed may be switched too frequently every time the active speaker changes. Such frequent changes in display are not suitable for viewing.

SUMMARY

A video processing apparatus includes a camera to continuously capture an image of an object to acquire video data, a memory, and circuitry to identify, from among a plurality of users appearing in the video data, a user who is speaking at a point in time when the video data is acquired as a currently-speaking user, store, in the memory, speech history information that associates, for each point in time when the video data is acquired during at least a predetermined time period, the currently-speaking user with time information indicating the point in time when the video data is acquired, and based on the speech history information, identify a first user currently speaking and a second user who is to be displayed enlarged together with the first user.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5A is a flowchart illustrating an operation of processing video, executed by the video processing apparatus according to an embodiment of the present invention;

FIG. 5B is a flowchart illustrating an operation of displaying video, executed by the reception terminal according to an embodiment of the present invention;

FIG. 6 is a flowchart illustrating an operation of determining a participant to be displayed enlarged based on information indicating the number of times of changes in an active speaker during a past predetermined period of time according to an embodiment of the present invention;

FIGS. 8A and 8B are a flowchart illustrating an operation of determining a participant to be displayed enlarged based on the number of times a specific participant was displayed enlarged together with the current speaker during a past predetermined period of time according to an embodiment of the present invention;

FIG. 11A is a flowchart illustrating an operation of processing video executed by the video processing apparatus using audio information according to an embodiment of the present invention, and FIG. 11B is a flowchart illustrating an operation executed by the reception terminal according to an embodiment of the present invention.

DETAILED DESCRIPTION

Figure 1A:
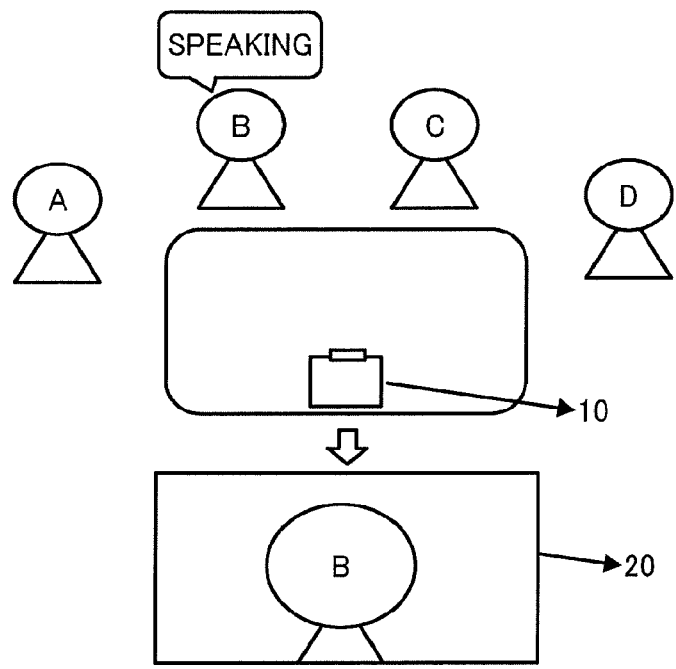
FIG. 1A is an illustration for explaining an enlarged image of one participant, with a video processing apparatus and a reception terminal according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the drawings for describing the following embodiments, the same reference numbers are allocated to elements (members or components) having the same function or shape and redundant descriptions thereof are omitted below.

Figure 1B:
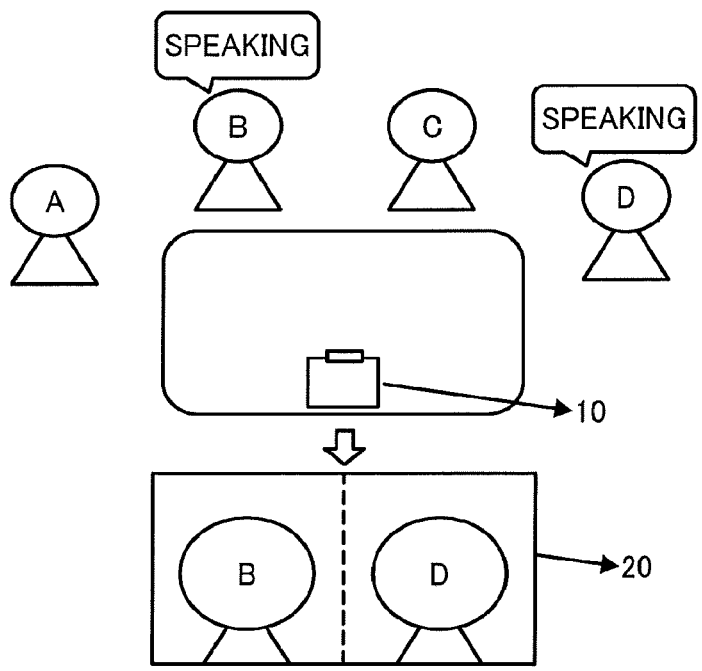
FIG. 1B is an illustration for explaining an enlarged image of two participants, with the video processing apparatus and the reception terminal, according to an embodiment of the present invention.

Several exemplary embodiments will be described hereinafter with reference to drawings. FIGS. 1A and 1B are each a schematic view for explaining operation, performed by a video processing apparatus 10 and a reception terminal 20, according to an embodiment of the present invention.

Figure 4:
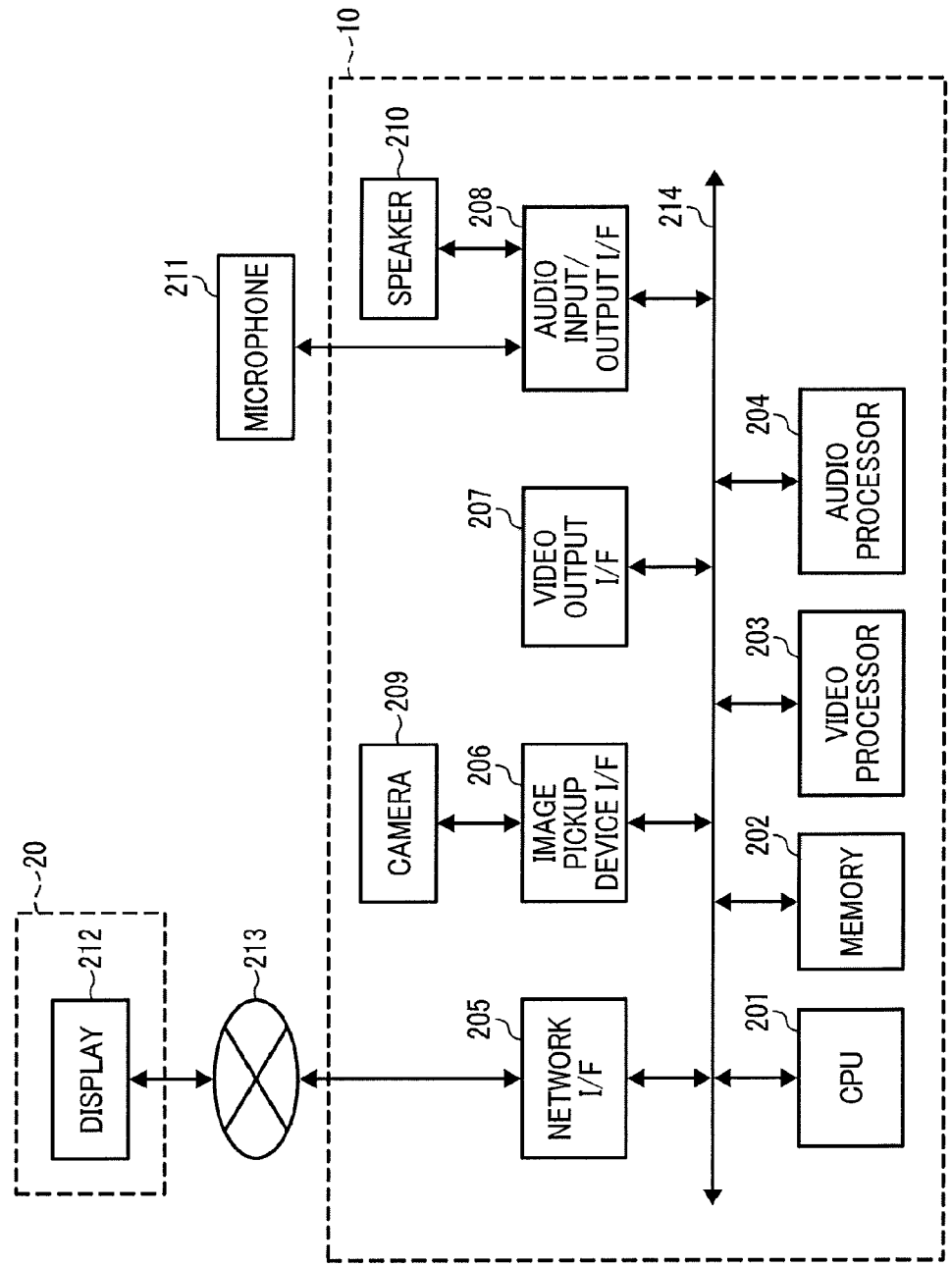
FIG. 4 is a block diagram illustrating hardware configurations of the video processing apparatus and the reception terminal according to an embodiment of the present invention.

In this embodiment, the video processing apparatus 10 is used in a video conference. As illustrated in FIGS. 1A and 1B, the video processing apparatus 10 captures video of a conference, in which participants A to D are participating, with an imaging device such as a camera 209 (FIG. 4). The reception terminal displays video on a screen, for example, through a display 212 (FIG. 4) according to a video signal transmitted from the video processing apparatus 10. When the participant B is speaking as illustrated in FIG. 1A, the video processing apparatus 10 identifies the participant B as a current speaker. In this case, the reception terminal 20 displays enlarged video of the participant B on the display 212. When the participant B is speaking and the video processing apparatus 10 predicts that the participant B and the participant D will speak by turns frequently, the reception terminal 20 displays the enlarged video of the participant B and the participant D on the display 212 as illustrated in FIG. 1B. FIGS. 1A and 1B are just examples illustrating how one or more participants are displayed enlarged. Alternatively, the current speaker may be displayed enlarged in a lower half area of the screen on the display 212, with an image showing all participants in an upper half area of the screen. Further, multiple participants may be displayed enlarged in different divisional areas in a lower half area of the screen on the display 212.

Hereinafter, a description is given of functional blocks of the video processing apparatus 10.

Figures 2, 3:
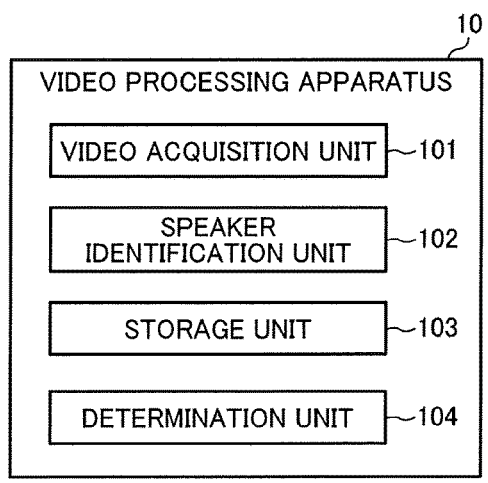
FIG. 2 is a block diagram illustrating a functional configuration of the video processing apparatus according to an embodiment of the present invention.
FIG. 3 is a view illustrating an example of speech history information according to an embodiment of the present invention.

FIG. 2 is a block diagram illustrating a functional configuration of the video processing apparatus 10. As illustrated in FIG. 2, the video processing apparatus 10 according to this embodiment includes a video acquisition unit 101, a speaker identification unit 102, a storage unit 103, and a determination unit 104.

The video acquisition unit 101 acquires video of scenes of the conference, and video-related information. In a case where a person is captured in the video, the video-related information includes coordinate data indicating a position of the person and the person's face. Accordingly, when a person is captured in the video, the person is identified based on the coordinate data.

The speaker identification unit 102 identifies a current speaker from among multiple persons included in the video and the video-related information acquired by the video acquisition unit 101. The speaker identification unit 102 may identify the current speaker, for example, by reading a change of facial expression or a mouse movement based on the coordinate data of the person's face. When the speaker identification unit 102 recognizes that no participant is currently speaking, the speaker identification unit 102 outputs a negative value as coordinates (expression used when no participant is speaking) as information indicating "no speaker". The operation of identifying the current speaker is known as face recognition techniques as disclosed in, for example, JP-H11-0352987-A, JP-2010-192956-A, and WO2005/114576. Therefore, a detailed description of an operation of identifying the current speaker is omitted below. The identification of the current speaker may also be implemented by any other desired operation. For example, the current speaker may be identified using voice recognition techniques as disclosed in JP-2005-274707-A and JP-2001-067098-A.

The storage unit 103 stores information on the current speaker identified by the speaker identification unit 102 based on the video and the video-related information in association with a point in time when the video-related information is acquired as speech history information. Specifically, the storage unit 103 stores speaker information in association with the point in time when the video-related information is acquired, as a speech history. The speaker information indicates a participant who is currently speaking (the identification of speaker), and a period of time during which the speaker keeps speaking (speech time).

FIG. 3 is a view illustrating an example of the speech history information. As illustrated in FIG. 3, in this embodiment, a plurality of users participate in the video conference, and the speech history information includes a period of time that has elapsed since the start of the conference, the speaker, a start time of speech, and a stop time of speech. The speech history information may further include a determination result, which indicates a specific participant to be displayed enlarged from among the plurality of participants. An operation of determining the enlarged display target will be described below. In an example of FIG. 3, the speech history information indicates that the participant A starts speaking from the start of the conference (0:00:00), and keeps speaking for 3 minutes (0:03:00). One or more participants to be displayed enlarged can be determined based on at least the information on the identification of the current speaker and the speech time. The speaker information may further include information on voice such as volume and tone of voice. Furthermore, in a case where two or more participants speak simultaneously or almost simultaneously, the speaker information may be stored in accordance with the volume of voice or the amount of face movement to determine the speaker to be displayed enlarged.

The determination unit 104 determines a specific participant to be displayed enlarged on the display 212 based on the speech history information. Specifically, the determination unit 104 refers to the speech history of a past predetermined period of time to determine whether the current speaker and the specific participant speak by turns for the number of times exceeding a predetermined threshold. In a case where the specific participant and the current speaker speak by turns for the number of times exceeding the threshold, the determination unit 104 determines that the specific participant is to be displayed enlarged with the current speaker.

Alternatively, the determination unit 104 determines a specific participant to be displayed enlarged on the display 212 with the current speaker based on information on a participant who was displayed enlarged with the current speaker in the past. Specifically, the determination unit 104 refers to enlarged display history information to identify a participant who was displayed enlarged with the current speaker in the past. When a predetermined condition is satisfied, the determination unit 104 determines that the participant who was displayed enlarged with the current speaker in the past is to be displayed enlarged with the current speaker.

Still alternatively, the determination unit 104 determines a specific participant to be displayed enlarged based on the number of speeches. Specifically, the determination unit 104 refers to information associating the numbers of speeches with the different participants during a past predetermined period of time to determine the number of times the current speaker spoke before the current time. When a predetermined condition is satisfied, the determination unit 104 determines that a participant who spoke frequently is to be displayed enlarged with the current speaker.

Hereinafter, a description is given of hardware configurations of the video processing apparatus 10 and the reception terminal 20 with reference to FIG. 4. Note that the hardware configuration as illustrated in FIG. 4 is just an example, and the video processing apparatus 10 and the reception terminal 20 may have any other hardware configuration that implements video processing according to this embodiment.

As illustrated in FIG. 4, the video processing apparatus 10 includes a central processing unit (CPU) 201, a memory 202, a video processor 203, an audio processor 204, a network interface (I/F) 205, an image pickup device I/F 206, the camera 209, a video output I/F 207, an audio input and output I/F 208, a speaker 210, and a system bus 214. The reception terminal 20 includes the display 212. An external microphone is connected to the audio input and output I/F 208. Such configuration is just an example, and the video processing apparatus 10 and the reception terminal 20 may have any other configuration. For example, the display 212 may be included in the video processing apparatus 10. Further, the microphone 211 or a plurality of the microphones 211 may be included in the video processing apparatus 10. The camera 209 and the speaker 210 may be provided separately from the video processing apparatus 10. Alternatively, the camera 209 and the speaker 210 may be included in the reception terminal 20. Furthermore, the video processing apparatus 10 may include a part of the plurality of microphones 211, while the other part of the microphones 211 is being connected to the apparatus 10. Still further, the image pickup device I/F 206 may be included in the video processor 203. The audio input and output I/F 208 may be included in the audio processor 204.

The CPU 201 loads programs or data from a storage device such as the memory 202, and executes processing to implement one or more functional blocks of the video processing apparatus 10 as illustrated in FIG. 2. The memory 202 is implemented by the storage device such as a random access memory (RAM), a read only memory (ROM), and a hard disc drive (HDD). The memory stores various software, data, video, video-related information, audio, and audio-related information processed by the CPU 201. The memory 202 further stores a predetermined threshold, which will be described later. The memory 202 still further stores the speaker history information every predetermined period of time under the control of the storage unit 103.

Further, the CPU 201 controls entire operation of the video processing apparatus 10. The video processor 203 performs various video processing on the video and the video-related information acquired by the image pickup device I/F 206. The audio processor 204 performs various audio processing on the audio and the audio-related information acquired by the audio input and output I/F 208. The video processor 203 and the audio processor 204 may include a processor such as a digital signal processor (DSP). The network I/F 205 connects the video processing apparatus 10 to a network 213. The network I/F 205 communicates data such as the video and audio to another apparatus including the reception terminal 20 via the network 213.

The image pickup device I/F 206 captures video signals output from the camera 209 as the video and the video-related information. Examples of the display 212 include a liquid crystal display (LCD) monitor and a projector. The display 212 may include the speaker 210 for outputting audio. The video output I/F 207 outputs video signals representing the video, a menu screen, a setting screen and the like via the network 213 to the display 212.

The audio input and output I/F 208 captures audio signals input via the microphone 211 as the audio and the audio-related information. Further, the audio input and output I/F 208 converts audio for output to audio signals that can be produced by the speaker 210. The system bus 214 includes an address bus and a data bus, and communicates control signals with each component of the video processing apparatus 10.

Hereinafter, a description is given of an operation of processing video according to this embodiment.

FIG. 5A is a flowchart illustrating an operation executed by the video processing apparatus 10. FIG. 5B is a flowchart illustrating an operation executed by the reception terminal 20. In this embodiment, a description is given a case where the video processing apparatus 10 is used in the video conference. In this embodiment, the reception terminal 20 receives the video from the video processing apparatus 10 to display video on the display 212. Alternatively, the display 212 may be included in the video processing apparatus 10.

Firstly, the video processing apparatus 10 acquires the video of scenes of the conference captured by the camera 209, and the video-related information (S1). The video-related information includes coordinate data indicating a position of a person and a person's face. The position of the person and the like are identified based on the coordinate data. Thereafter, the video processing apparatus 10 identifies the current speaker based on the video and the video-related information (S2). In this embodiment, the video processing apparatus 10 identifies the current speaker by a face recognition operation of reading a change of facial expression or a mouse movement based on the coordinate data of the person's face. However, the video processing apparatus 10 may identify the current speaker by any other operation. In a case where two or more participants speak simultaneously or almost simultaneously, the video processing apparatus 10 identifies each of the two or more participants as the current speaker.

Thereafter, the video processing apparatus 10 determines a specific participant to be displayed enlarged on the display 212 from among the plurality of participant based on the information on the current speaker (S3). Specifically, the video processing apparatus 10 determines whether the acquired video includes a specific participant to be displayed enlarged on the display 212 based on the number of times the current speaker and the specific participant speak by turns for a past predetermined period of time. Alternatively, the video processing apparatus 10 determines a specific participant to be displayed enlarged on the display 212 with the current speaker based on the enlarged display history information indicating a period of time during which the specific participant was displayed enlarged with the current speaker for a past predetermined period of time. Still alternatively, the video processing apparatus 10 determines a specific participant to be displayed enlarged on the display 212 with the current speaker based on the number of times each participant spoke during a past predetermined period of time.

When the video processing apparatus 10 determines the video does not include a participant to be displayed enlarged on the display 212 (S3: NO), the processing proceeds to S5. For example, when the current speaker is not included in the video, the video processing apparatus 10 determines that no participant is to be displayed enlarged. When the video processing apparatus 10 determines the specific participant to be displayed enlarged on the display 212 (S3: YES), the video processing apparatus 10 processes the video such that the determined specific participants is displayed enlarged with the current speaker on the display 212 (S4). When the video processing apparatus 10 determines the video acquired at S1 does not include a participant to be displayed enlarged (S3: NO), the video processing apparatus 10 skips the operation of S4 such that the video captured by the camera 209 is displayed on the display 212.

The video processing apparatus 10 transmits video signals representing the video acquired at S1 or the video processed at S4 via the video output I/F 207 to the reception terminal 20 including the display 212 (S5). Referring to FIG. 5B, the reception terminal 20 receives the video signals from the video processing apparatus 10 (S6). Thereafter, the reception terminal 20 displays video based on the received video signals on the display 212 such as the LCD monitor and the projector (S7).

Hereinafter, a description is given of several examples of an operation by the determination unit 104 of determining a specific participant to be displayed enlarged with the current speaker on the display 212.

FIG. 6 is a flowchart illustrating an example of an operation of determining a specific participant to be displayed enlarged with the current speaker. Specifically, in the example operation of FIG. 6, a target to be displayed enlarged is determined based on speaker change history information indicating the number of times of changes in the active speaker during a past predetermined period of time stored in the storage unit 103. Note that FIGS. 6, 8A and 8B, and 10A and 10B, each illustrates a detailed operation of S3 of FIG. 5A.

Firstly, the determination unit 104 determines whether any participant is speaking currently (S301). When the determination unit 104 determines no participant is currently speaking (S301: NO), the determination unit 104 determines a target to be displayed enlarged is not present (S309). Accordingly, the video processing apparatus 10 outputs the video signal representing the video acquired by the camera 209 at S1 of FIG. 5A. When the determination unit 104 determines that a certain participant is speaking currently (S301: YES), the determination unit 104 identifies current speaker. In this example, the determination unit 104 identifies Participant A as the current speaker, for example, who will be referred to as "Speaker A" for purposes of the following description (S302).

Thereafter, the determination unit 104 refers to information on a precedent speaker, who spoke before Speaker A, to determine whether a time interval between the end of speech by the precedent speaker and the start of speech by Speaker A exceeds a predetermined period of time (S303). The determination unit 104 performs this determination to determine a change from the precedent speaker to Speaker A is a continuous change in the active speaker. Specifically, when the determination unit 104 determines that the time interval between the end of speech by the precedent speaker and the start of speech by Speaker A exceeds the predetermined period of time, the determination unit 104 recognizes the change in the active speaker from the precedent speaker to Speaker A as a non-continuous change. When the determination unit 104 determines that the time interval between the end of speech by the precedent speaker and the start of speech by Speaker A exceeds the predetermined period of time (S303: YES), the determination unit 104 determines only Speaker A as the target to be displayed enlarged. The end of speech is determined based on the following conditions (a) to (c):

(a) Using audio data, the video processing apparatus 10 determines that speech is ended when sound stops for a predetermined period of time.

(b) Using audio data, the video processing apparatus 10 performs voice recognition operation to detect a change in the active speaker and to determine that speech by the precedent speaker is ended when the next speaker keeps speaking for a predetermined period of time.

(c) Using video data, the video processing apparatus 10 determines that speech is ended when a movement of the speaker's mouth stops for a predetermined period of time.

Figure 7:
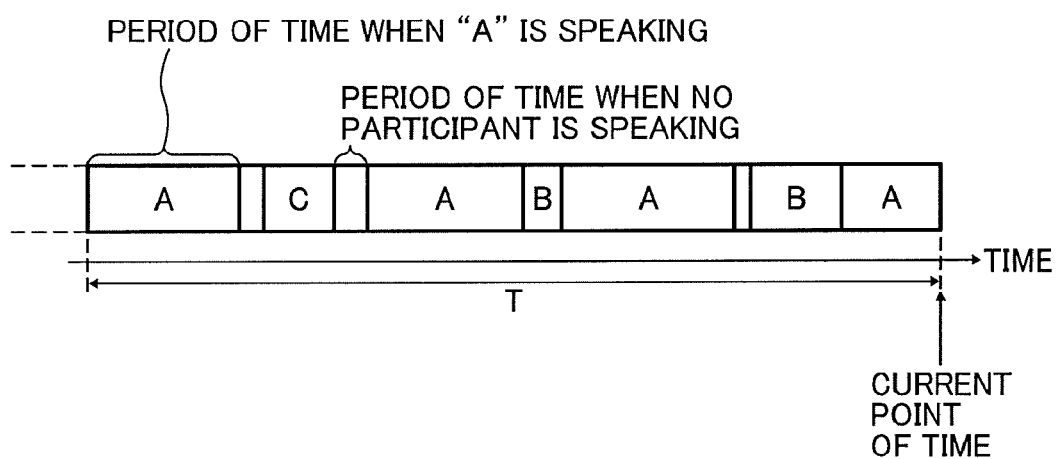
FIG. 7 is a view illustrating an example of speaker history information for a predetermined period of time according to an embodiment of the present invention.

When the determination unit 104 determines that the time interval between the end of speech by the precedent speaker and the start of speech by Speaker A is shorter than the predetermined period of time (S303: NO), the determination unit 104 recognizes the change in the active speaker from the precedent speaker to the Speaker A as a continuous change. In this case, the determination unit 104 identifies the precedent speaker. In this example, the determination unit 104 identifies Participant B as the precedent speaker, for example, who will be referred to as "Speaker B" for purposes of the following description (S304). After identifying Speaker B as the precedent speaker, the determination unit 104 counts the number of times Speaker A and Speaker B spoke by turns without an time interval that exceeds the predetermined period of time during a past predetermined period of time T (S305). FIG. 7 illustrates an example of the speaker change history for the past period of time T. As illustrated in FIG. 7, Speakers A to C spoke by turns during the past period of time T. Assuming that a change in the active speaker from Speaker A to Speaker B and from Speaker B to Speaker B each is counted as one change, in an example of FIG. 7, the number of changes in the active speaker between Speaker A and Speaker B is four.

After counting the number of changes in the active speaker between Speaker A and Speaker B, the determination unit 104 determines whether the counted number of changes exceeds a predetermined threshold (S306). When the counted number of changes is equal to or smaller than the threshold (S306: NO), the determination unit 104 determines only Speaker A as a target to be displayed enlarged (S308). By contrast, when the counted number of changes is larger than the threshold (S306: YES), the determination unit 104 determines both Speaker A and Speaker B the targets to be displayed enlarged (S307). Thus, the target to be displayed enlarged is determined based on the current speaker and the precedent speaker. Accordingly, a main speaker is presumed from among the plurality of participants in the video conference and is determined the target to be displayed enlarged with the current speaker based on the speech history.

Figure 8B:
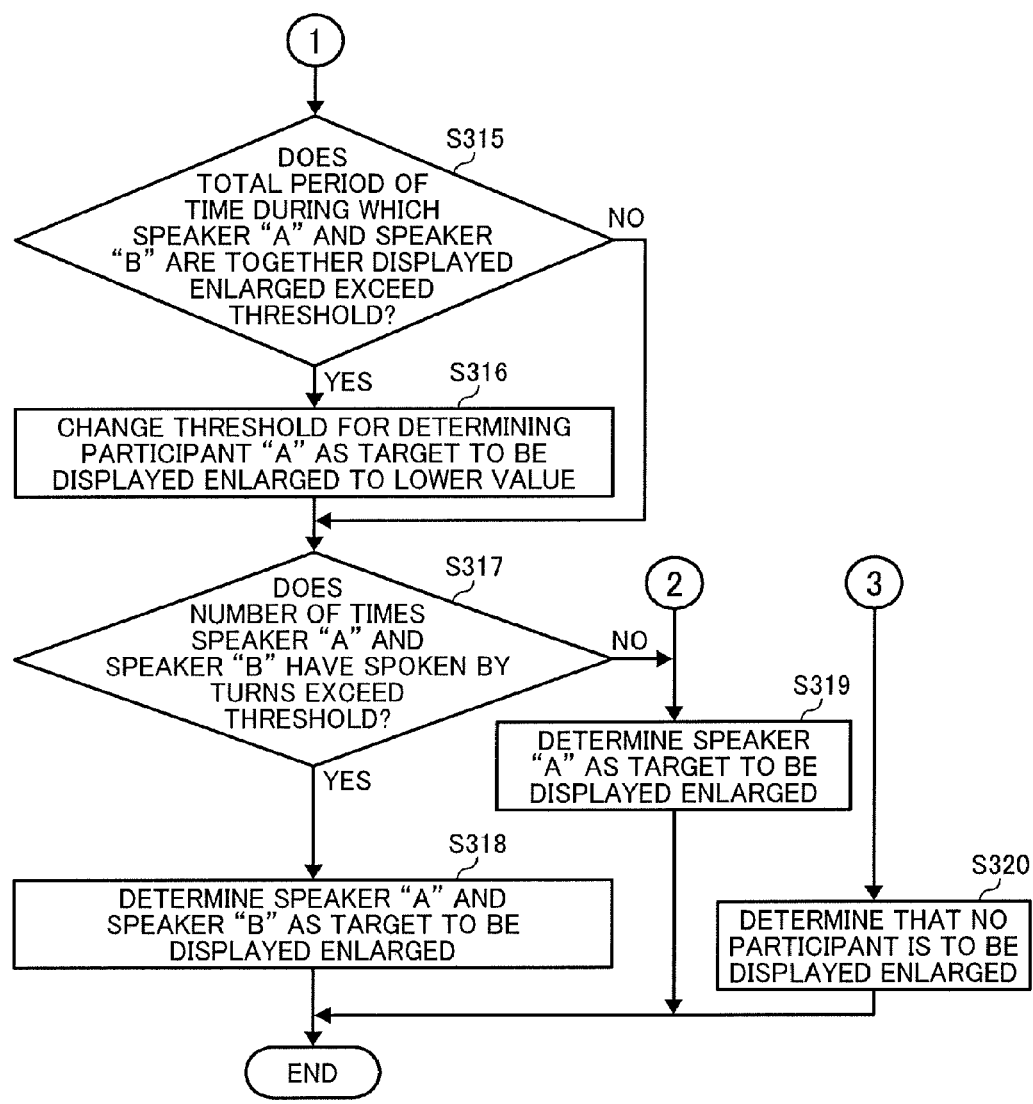

Hereinafter, a description is given of another example of the operation by the determination unit 104 of determining the specific participant to be displayed enlarged with reference to FIGS. 8A and 8B. FIGS. 8A and 8B are a flowchart illustrating another example of an operation of determining the specific participant to be displayed enlarged with the current speaker. Specifically, in the example operation of FIGS. 8A and 8B, a target to be displayed enlarged is determined based on the enlarged display history information for a past predetermined period of time stored in the storage unit 103.

Operations of S310 to S314 are the same or substantially the same as those of S301 to S302 of FIG. 6, and the description thereof is omitted. After counting the number of changes in the active speaker between speaker A and Speaker B (S314), the determination unit 104 refers to the enlarged display history information for a past predetermined period of time U to determine whether a total of one or more periods of times during which Speaker A and Speaker B are together displayed enlarged exceeds a predetermined threshold (S315).

Figure 9:
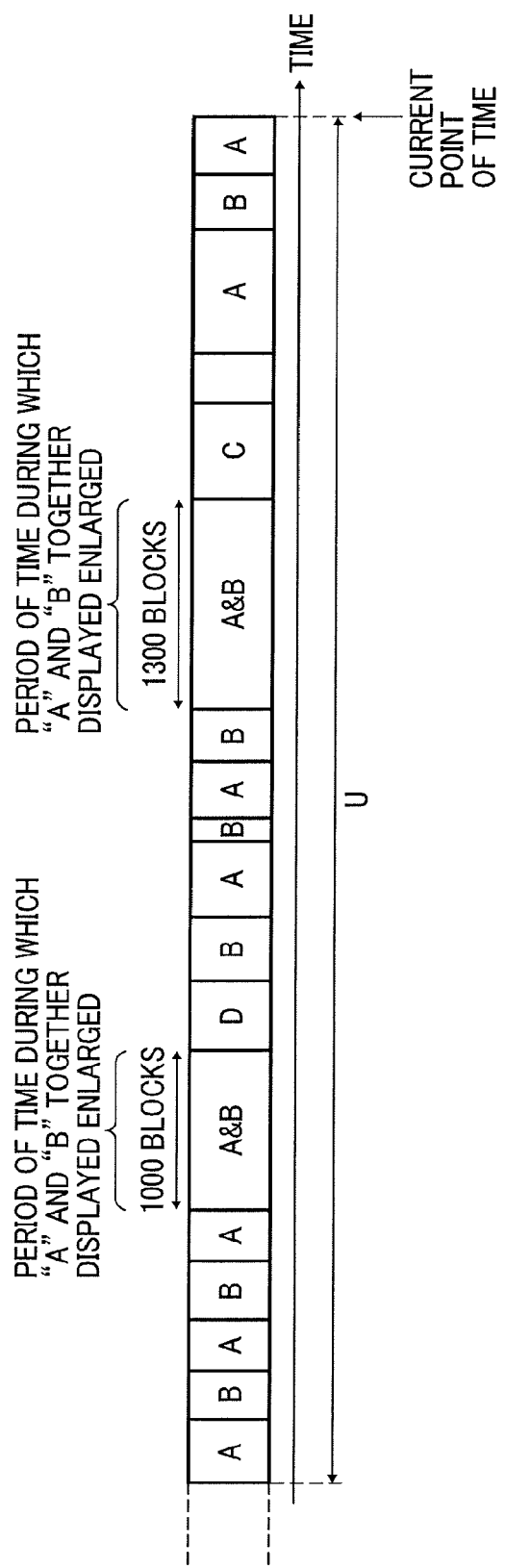
FIG. 9 is a view illustrating an example of enlarged display history information for a past predetermined period of time according to an embodiment of the present invention.

FIG. 9 illustrates an example of the enlarged display history information for the past period of time U. As illustrated in FIG. 9, the total of periods of time during which Speaker A and Speaker B are together displayed enlarged during the past period of time U is 2300. Assuming that the threshold is preset to 2000, the determination unit 104 determines that the total of periods of time exceeds the threshold. When the determination unit 104 determines that the total of periods of time is longer than the threshold (S315: YES), the determination unit 104 changes the threshold that is compared with the number of changes in the active speaker between Speaker A and Speaker B to a smaller value (S316). Alternatively, at S316, the determination unit 104 may change the threshold to a larger value.

Thereafter, the determination unit 104 determines whether the number of changes in the active speaker between Speaker A and Speaker B, which is counted at S314, exceeds the threshold value that is changed at S316 (S317). When the counted number of changes is larger than the threshold (S317: YES), the determination unit 104 determines both Speaker A and Speaker B as the targets to be displayed enlarged (S318). When the determination unit 104 determines that the total of periods of time is equal to or shorter than the threshold (S315: NO), the threshold that is compared with the number of change in the active speaker between Speaker A and Speaker B is kept unchanged, and the determination at S317 is performed based on the unchanged threshold. Operations of S319 and S320 are the same or substantially the same as those of S308 and S309 of FIG. 6, respectively, and the description thereof is omitted. Thus, the target to be displayed enlarged is determined based on the enlarged display history information for the past period of time U that is longer the past period of time T.

Further, as the threshold that is compared with the number of changes in the active speaker between Speaker A and Speaker B for determining the target to be displayed enlarged is changed, a specific participant who frequently speaks before or after Speaker A is presumed and determined readily as a target to be displayed enlarged.

When the threshold is changed to a smaller value, more numbers of participants are determined as the targets to be displayed enlarged with Speaker A. Accordingly, a more number of participants are displayed enlarged. When the threshold is changed to a larger value, the target to be displayed enlarged is determined focusing on a main speaker in the video conference, etc. Accordingly, a limited number of participants are displayed enlarged.

Figure 10A:
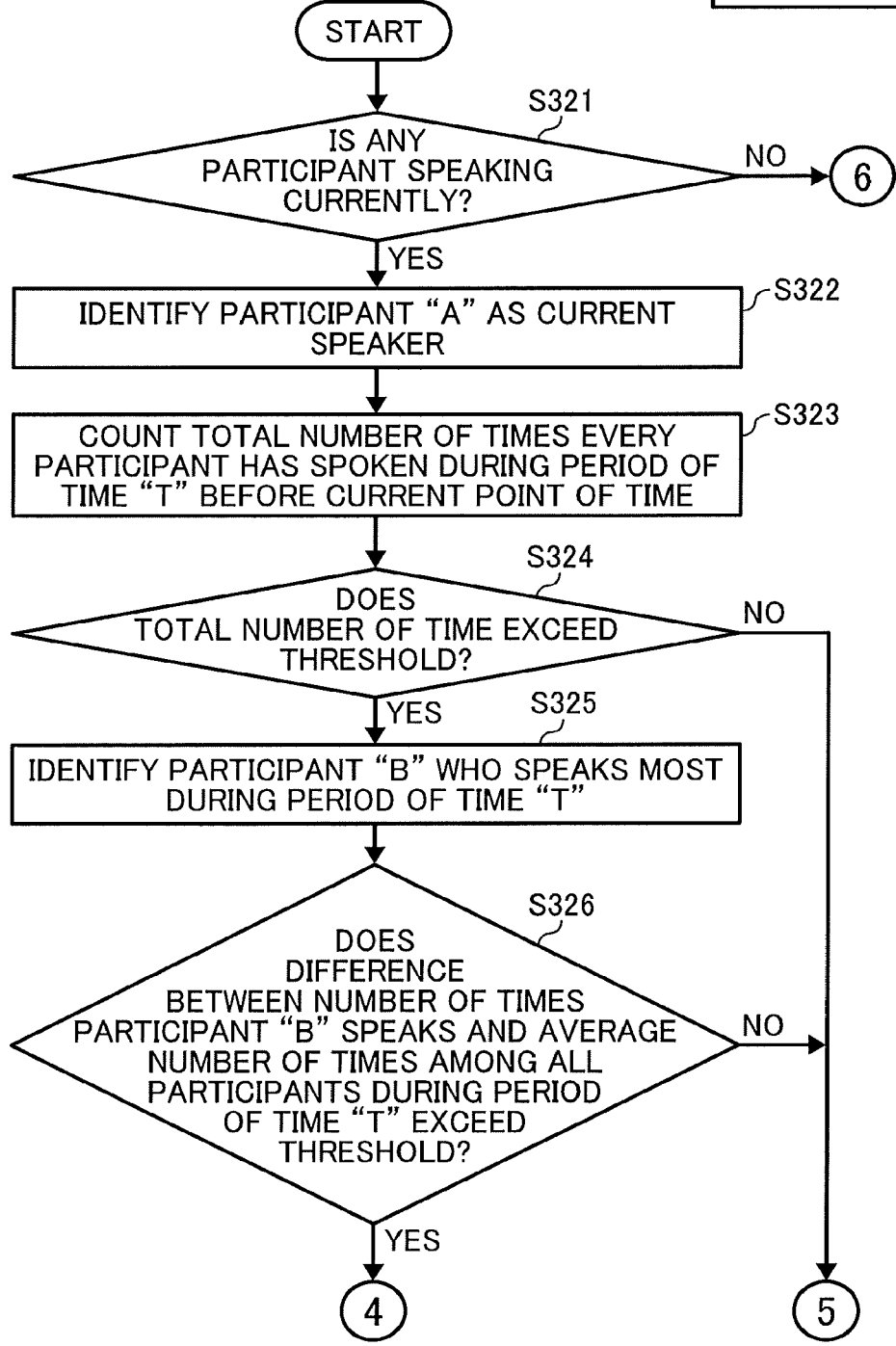
FIGS. 10A and 10B are a flowchart illustrating an operation of determining a participant to be displayed based on the number of times of speeches by each participant during a past predetermined period of time according to an embodiment of the present invention.
Figure 10B:
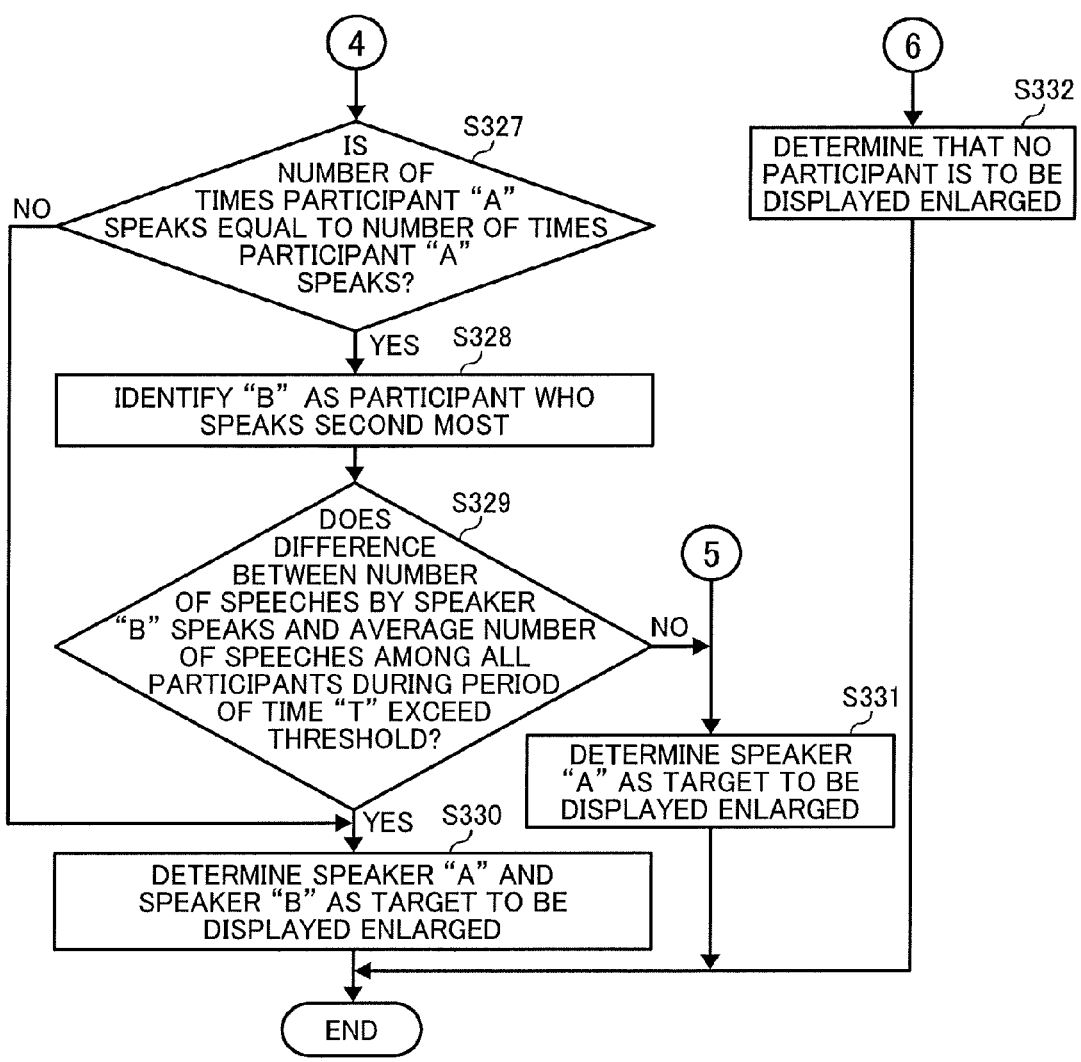

Hereinafter, a description is given of still another example of an operation by the determination unit 104 of determining the specific participant to be displayed enlarged with reference to FIGS. 10A and 10B. FIGS. 10A and 10B are a flowchart illustrating a still another example of an operation of determining a specific participant to be displayed enlarged with the current speaker. Specifically, in the example operation of FIGS. 10A and 10B, the target to be displayed enlarged is determined based on the numbers of speeches associated with the different participants during a predetermined period of time stored in the storage unit 103.

Operations of S321 to S322 are the same or substantially the same as those of S301 to S302 of FIG. 6, and the description thereof is omitted. After identifying the current Speaker A (S322), the determination unit 104 counts a total number of speeches by the plurality of participants during the past predetermined period of time T (S323). Alternatively, at S323, the determination unit 104 may count the total number of speeches during the past predetermined period of time U. Still alternatively, the determination unit 104 may count the total number of speeches during any other period of time.

Thereafter, the determination unit 104 determines whether the counted total number of speeches by the plurality of participants during the period of time T exceeds a predetermined threshold (S324). When the determination unit 104 determines that the counted total number of speeches is equal to or smaller than the threshold (S324: NO), the determination unit 104 determines only Speaker A as the target to be displayed enlarged (S331).

By contrast, when the determination unit 104 determines that the counted total number of speeches is larger than the threshold (S324: YES), the determination unit 104 identifies a specific participant who spoke most frequently during the past period of time T (S325). In this example, the determination unit 104 identifies Participant B as the specific speaker who spoke most frequently during the past period of time T, for example, who will be referred to as "Speaker B" for purposes of the following description. Thereafter, the determination unit 104 subtracts an average number of speeches by the plurality of participants during the past period of time T from the number of speeches by Speaker B to determine a difference obtained by the subtraction exceeds a predetermined threshold (S326). The average number of speeches may be any one of the mean, median, and mode.

When the determination unit 104 determines that the difference is equal to or smaller than the threshold (S326: NO), the determination unit 104 determines only Speaker A as the target to be displayed enlarged (S331). By contrast, when the determination unit 104 determines that the difference is larger than the threshold (S326: YES), the determination unit 104 determines whether the number of speeches by Speaker A and the number of speeches by Speaker B are equal to each other (S327). When the determination unit 104 determines that the number of speeches by Speaker A and the number of speeches by Speaker B are equal to each other (S327: YES), the determination unit 104 recognizes Speaker B as a speaker who spoke second most frequently (S328). Although, in fact, the number of speeches by Speaker A and the number of speeches by Speaker B are equal to each other, Speaker A is recognized as a speaker who spoke most frequently taking the current speech into consideration at S328.

Thereafter, the determination unit 104 subtracts an average number of speeches by the plurality of participants during the past period of time T from the number of speeches by Speaker B during the past period of time T to determine the difference obtained by the subtraction exceeds a predetermined threshold (S329). When the difference is larger than the threshold (S329: YES), the determination unit 104 determines both Speaker A and Speaker B as the targets to be displayed enlarged (S330).

Further, when the determination unit 104 determines that the number of speeches by Speaker A and the number of speeches by Speaker B is not equal to each other (S327: YES), the determination unit 104 recognizes Speaker B as a speaker who spoke most frequently. In this case, the determination unit 104 determines both Speaker A and Speaker B as the targets to be displayed enlarged (S330). An operation of S332 is the same or substantially the same as that of S309 of FIG. 6, and the description thereof is omitted. Thus, the target to be displayed enlarged is determined based on the number of speeches during the past predetermined period of time. Alternatively, the determination unit 104 gives a high priority to a participant who speaks frequently in determining the target to be displayed enlarged instead of determining the target based on the average number of speeches with respect to the total number of speeches.

Hereinafter, a description is given of an operation of processing video according to another embodiment. Specifically, in this embodiment, the video processing apparatus 10 determines the target to be displayed using audio such as voice of the speaker and audio-related information. FIG. 11A is a flowchart illustrating an operation executed by the video processing apparatus 10 using audio data. FIG. 11B is a flowchart illustrating an operation executed by the reception terminal 20.

Firstly, the video processing apparatus 10 acquires audio and audio-related information from the video including scenes of the conference captured by the camera 209 (S8). The audio and the audio-related information are acquired from sounds collected by the microphone 211, for example, which is provided outside the video processing apparatus 10 or included in the video processing apparatus 10. Thereafter, the video processing apparatus 10 identifies the current speaker based on the audio and the audio-related information (S9). The current speaker is identified with any desired operation including direction of arrival estimation of audio using a microphone array.

Thereafter, the video processing apparatus 10 determines a specific participant to be displayed enlarged on the display 212 from among the plurality of participant based on the information on the current speaker (S10). The determination at S10 may be implemented by the three example operations described above with reference to FIGS. 6, 8A and 8B, and 10A and 10B, either individually or in combination, using information estimated based on the speaker's voice, for example.

When the video processing apparatus 10 determines the video does not include a participant to be displayed enlarged on the display 212 (S10: NO), the processing proceeds to S12. For example, when the current speaker is not included in the video, the video processing apparatus 10 determines that no participant is to be displayed enlarged. When the video processing apparatus 10 determines the specific participant to be displayed enlarged on the display 212 (S10: YES), the video processing apparatus 10 processes the video such that the determined specific participants is displayed enlarged with the current speaker on the display 212 (S11). When the video processing apparatus 10 determines the video does not include a participant to be displayed enlarged (S10: NO), the video processing apparatus 10 skips the operation of S11 such that the video captured by the camera 209 is displayed on the display 212.

The video processing apparatus 10 sends video signals representing the video acquired captured by the camera 209 or the video processed at S11 via the video output I/F 207 to the reception terminal 20 including the display 212 (S12). Referring to FIG. 11B, the reception terminal 20 receives the video signals from the video processing apparatus 10 (S13). Thereafter, the reception terminal 20 displays video based on the received video signals on the display 212 such as the LCD monitor and the projector (S14).

Several exemplary embodiments have been described heretofore. Although the specific examples have been described, various modifications and improvements are possible within the scope of the appended claims. For example, a description has been made heretofore of determining one or more participants to be displayed enlarged with the face recognition operation using a position of a person and facial data in the video or with the estimation of direction of arrival of audio using a microphone array. Such face recognition operation and estimation of direction of arrival of audio may be used in combination to determine one or more participants to be displayed enlarged.

In consideration of a case where a position of a participant is not specified due to noises in video signals or a case where audio signals are not correctly received due to noises, both video and audio information may be used in combination to improve the accuracy of determination as to which participants to be displayed enlarged.

Although three examples for determining a target to be displayed enlarged have been described above, these three examples may also be used in combination to implement plural determination processes. Such determination based on plural criteria may improve the accuracy of determination of one or more participants to be displayed enlarged. Although a description has been made heretofore of a case where one or two participants are displayed enlarged, three or more participants may be determined to be displayed enlarged.

With configurations and processes as described above, the current speaker is displayed enlarged with certainty while suppressing overly quick switching of screen. Furthermore, a participant to be displayed enlarged together with the current speaker is determined based on the estimation of the participant who speak mainly in the video conference and the like.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A video processing apparatus comprising:
   a camera to continuously capture an image of an object to acquire video data;
   a memory; and
   circuitry to:
   identify, from among a plurality of users appearing in the video data, a user who is speaking at a point in time when the video data is acquired as a currently-speaking user, the plurality of users including at least three users;

identify, from among the plurality of users, a first user and a second user who have spoken a total number of speeches that exceed a first threshold;
select the second user as one of the plurality of users who has spoken a largest number of speeches;
indicate that the first user and the second user are to be alternately displayed at least three times, when the first user and the second user are identified as alternately speaking;
indicate that the first user and the second user are to be simultaneously displayed as the first user and the second user alternately speak at least two times, after the first user and the second user are alternately displayed at least three times; and
indicate that a third user is to be displayed without the first user and without the second user, when the third user speaks immediately after the first user and the second user are simultaneously displayed.

2. The video processing apparatus according to claim 1, wherein the circuitry identifies a user who speaks subsequently to the first user for a number of times that is larger than a second threshold as the second user who is to be displayed enlarged with the first user.

3. The video processing apparatus according to claim 2, wherein the memory further stores enlarged display history information indicating the user who is displayed enlarged, and
the circuitry calculates a period of time during which the first user and second user together displayed enlarged based on the enlarged display history information, and determines whether to change the second threshold in accordance with the calculated period of time during which the first user and second user together displayed enlarged.

4. The video processing apparatus according to claim 1, wherein, in identifying the user who is speaking, the circuitry recognizes positions of the plurality of users appearing in the video data as coordinate data of a face, and
the circuitry outputs the coordinate data of the face of the user who is identified as speaking.

5. The video processing apparatus according to claim 1, further comprising a microphone to acquire audio data including information on direction of arrival of audio,
wherein the circuitry identifies the user who is speaking based on the audio data.

6. The video processing apparatus according to claim 5, wherein the circuitry identifies the user who is speaking based on both the video data and the audio data.

7. A video processing method comprising:
continuously capturing, with a camera, an image of an object to acquire video data;
identifying, from among a plurality of users appearing in the video data, a user who is speaking at a point in time when the video data is acquired as a currently-speaking user, the plurality of users including at least three users;
identifying, from among the plurality of users, a first user and a second user who have spoken a total number of speeches that exceed a first threshold;
selecting the second user as one of the plurality of users who has spoken a largest number of speeches;
indicating that the first user and the second user are to be alternately displayed at least three times, when the first user and the second user are identified as alternately speaking;
indicating that the first user and the second user are to be simultaneously displayed as the first user and the second user alternately speak at least two times, after the first user and the second user are alternately displayed at least three times; and
indicating that a third user is to be displayed without the first user and without the second user, when the third user speaks immediately after the first user and the second user are simultaneously displayed.

8. A video processing system, comprising:
a video acquisition unit to continuously capture an image of an object to acquire video data;
a speaker identification unit to identify, from among a plurality of users appearing in the video data, a user who is speaking at a point in time when the video data is acquired as a currently-speaking user, the plurality of users including at least three users;
a determination unit to identify, a first user and a second user who have spoken a total number of speeches that exceed a first threshold;
a selection unit to select the second user as one of the plurality of users who has spoken a largest number of speeches; and
circuitry to
indicate that the first user and the second user are to be alternately displayed at least three times, when the first user and the second user are identified as alternately speaking;
indicate that the first user and the second user are to be simultaneously displayed as the first user and the second user alternately speak at least two times, after the first user and the second user are alternately displayed at least three times; and
indicate that a third user is to be displayed without the first user and without the second user, when the third user speaks immediately after the first user and the second user are simultaneously displayed.

* * * * *